(12) United States Patent
Ogura et al.

(10) Patent No.: US 6,810,912 B2
(45) Date of Patent: Nov. 2, 2004

(54) SPOOL VALVE WITH DECREASED FLUID FORCE ACTING ON SPOOL

(75) Inventors: Yuuji Ogura, Imizu-gun (JP); Satoshi Hamamoto, Nei-gun (JP); Zenzou Hamada, Uozu (JP); Satoshi Okude, Nei-gun (JP)

(73) Assignee: Nachi-Fujikoshi Corp., Toyama (JP)

( * ) Notice: Subject to any disclaimer, the term of this patent is extended or adjusted under 35 U.S.C. 154(b) by 0 days.

(21) Appl. No.: 10/446,114

(22) Filed: May 28, 2003

(65) Prior Publication Data

US 2003/0221731 A1 Dec. 4, 2003

(30) Foreign Application Priority Data

May 29, 2002 (JP) ........................................ 2002-155676
Dec. 4, 2002 (JP) ........................................ 2002-352936

(51) Int. Cl.[7] .............................................. F15B 13/04
(52) U.S. Cl. ................................................. 137/625.69
(58) Field of Search ..................................... 137/625.69

(56) References Cited

U.S. PATENT DOCUMENTS

2002/0079002 A1 * 6/2002 Ueki ........................ 137/625.3

FOREIGN PATENT DOCUMENTS

JP    09 269084    10/1997
JP    11-082767    3/1999

OTHER PUBLICATIONS

Toshio Takenaka and Eizo Urata, "Hydraulic Pressure Control", 2nd edition, 4th issue, Maruzen Co., Ltd., Feb. 20, 1986, pp. 88–89.

* cited by examiner

*Primary Examiner*—Gerald A. Michalsky
(74) *Attorney, Agent, or Firm*—Venable LLP; Catherine M. Voorhees (57) ABSTRACT

A spool valve comprises a slidable spool, and through displacement of the spool a supply port of the valve is allowed to communicate with one of the load ports of the valve while the other load port is allowed to communicate with a corresponding one of return ports of the valve. The spool is provided with a portion, the outside diameter of which gradually increases, at least on the other load port side from the center of a central concave portion of the spool. The outside diameter gradually increasing portion decreases fluid force which acts against an operating force of the spool when the valve is activated.

14 Claims, 10 Drawing Sheets

SPOOL VALVE WITH DECREASED FLUID FORCE ACTING ON SPOOL

BACKGROUND OF THE INVENTION

The present invention relates to a spool type directional control valve (spool valve) which decreases a fluid force acting on a spool.

The directional control valve of a spool valve type has a construction in which flow paths are switched over by a spool sliding axially in a slide hole in a valve body.

Figure 12:
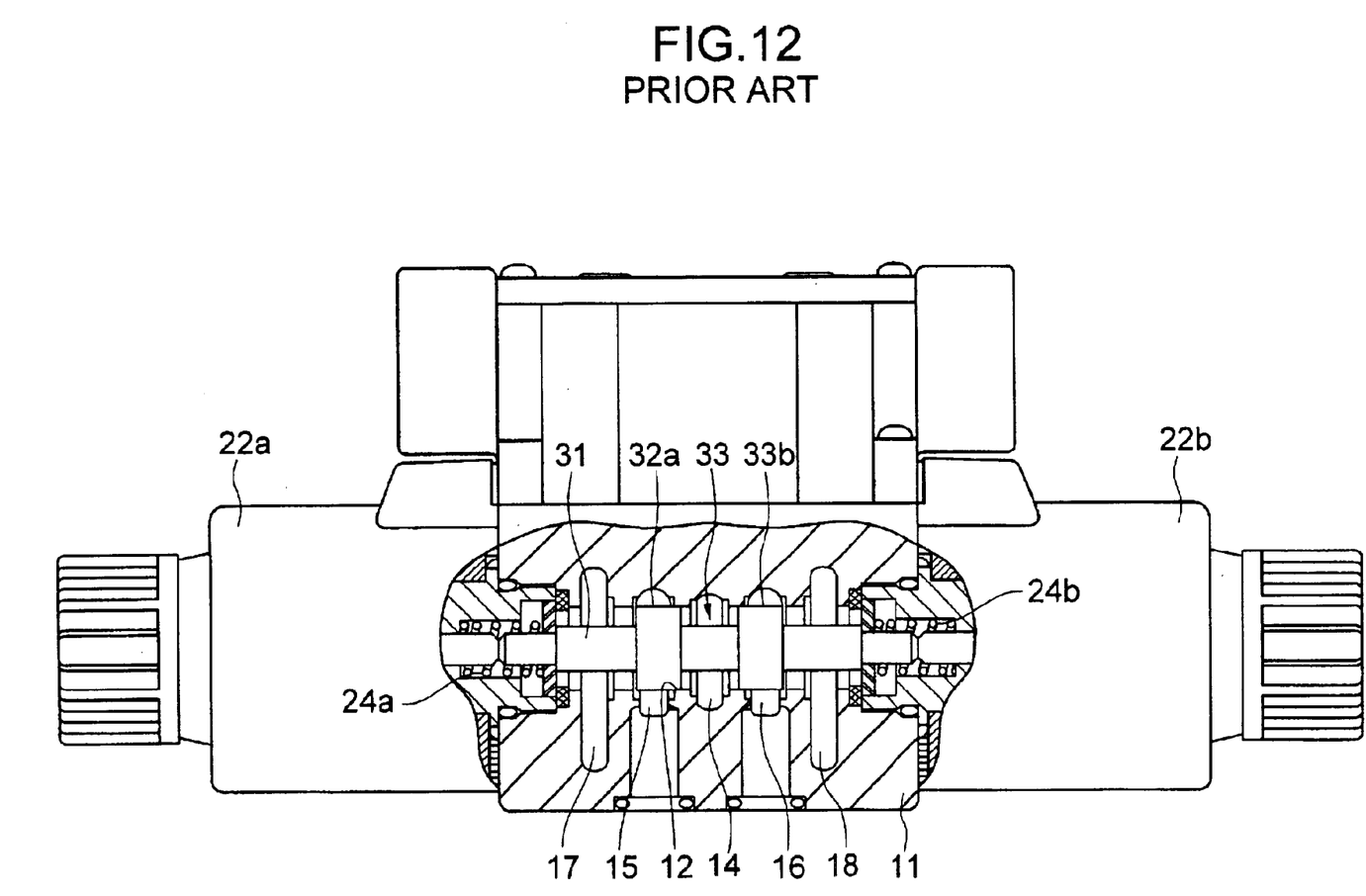
FIG. 12 is a sectional view of a conventional four-port electromagnetic spool valve in which fluid compensation is not made.

More specifically, for example, in a four-port directional control valve (four-port switching valve), as shown in FIG. 12, provided in a slide hole 12 formed in a valve body 11 are an annular supply port 14, two annular load ports 15, 16 disposed symmetrically with respect to the supply port, and annular return ports 17, 18 disposed on the opposite outsides of the load ports.

A spool 31 is received in the slide hole, and is held at a neutral position by springs 24a, 24b provided on both sides of the valve body 11. The spool 31 is formed with an annular central concave portion 33 and two land portions 32a, 32b disposed symmetrically on both sides of the central concave portion 33. At the neutral position of the spool 31, the central concave portion 33 opens to the supply port 14, and the land portions 32a, 32b block off the load ports 15, 16 from the supply port 14. The spool 31 is moved axially in the slide hole 12 by solenoids 22a, 22b provided at the left and right of the valve body 11.

When the spool 31 moves, the supply port 14 is bought into communication with either one of the load ports 15, 16, and at the same time, the other of the load ports 15, 16 is allowed to communicate with the adjacent return port 17 or 18. Thus, the spool valve selectively supplies hydraulic fluid from the supply port to one load port, and selectively returns the hydraulic fluid from the other load port to the return port to perform the switching of the hydraulic fluid. Another spool shape may be used to appropriately change the selection of flow paths.

In the above-described directional control valve, as the hydraulic fluid spurts out from the supply port to the load port, a fluid force that resists the spool operating force acts on the spool. Various measures have been proposed for decreasing this fluid force.

Figure 13:
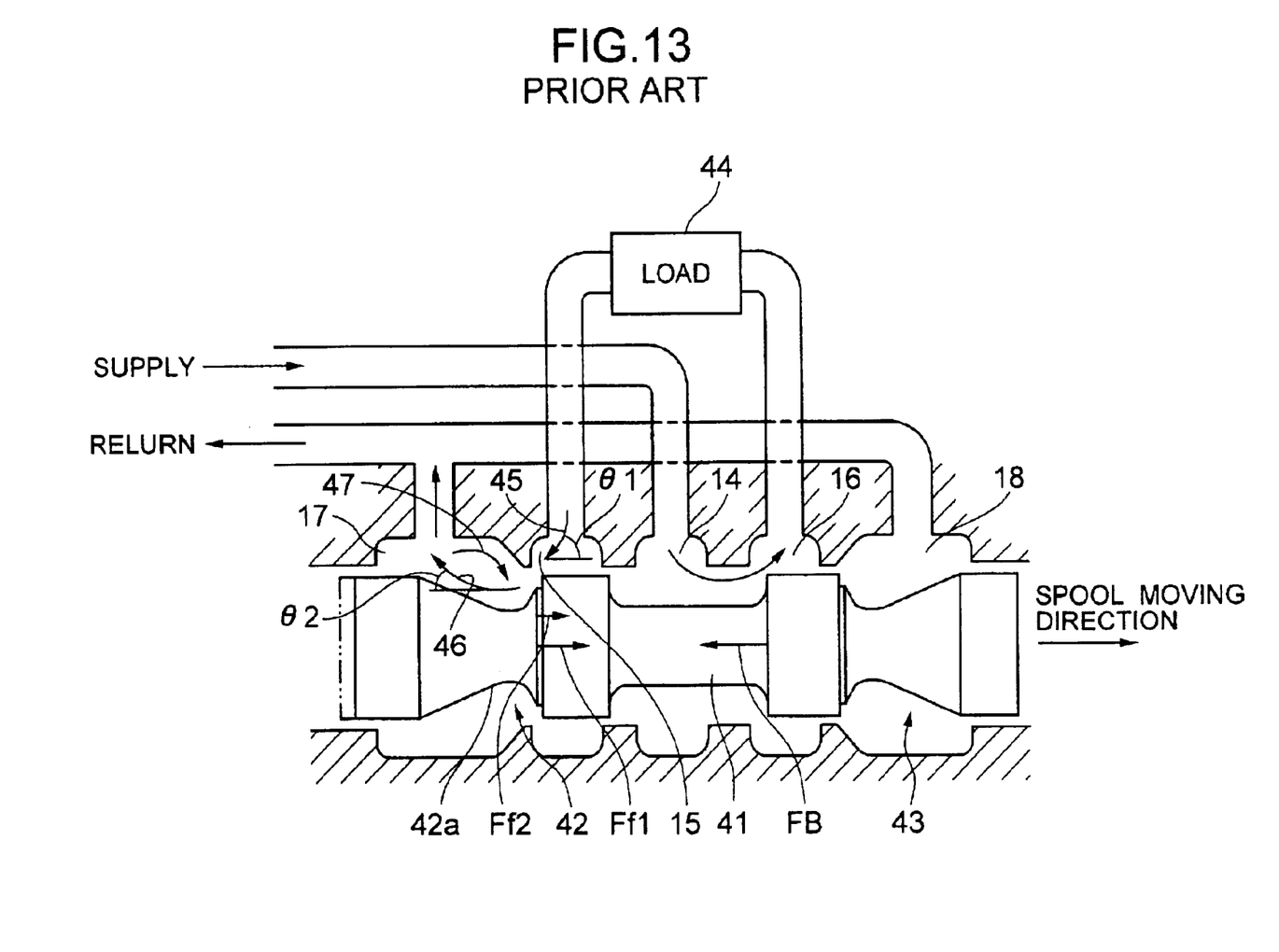
FIG. 13 is a schematic view of a conventional spool valve in which fluid compensation is made at return ports.

Shown in FIG. 13 is a basic construction for this end, in which fluid compensating pockets 42, 43 utilizing a return flow are provided on the return port side at both ends of the spool 41. FIG. 13 shows a state in which a spool 41 moves to the right, fluid flows from the supply port 14 to the load port 16, returns to the load port 15 via a load 44, and flows into the return port 17. When the hydraulic fluid flows from the supply port 14 to the load port 16, pressure unbalance occurs between both wall surfaces of the spool, and resultantly a force FB acting to close the spool 41 is created.

At this time, the flow from the load port 15 to the return port 17 includes a flow 45 going from the load port 15 into the return port 17 at an angle θ1 and a flow 46 going along an inclined surface 42a of the pocket 42 at an angle θ2. Taking the spool moving direction as positive, the axial force of the spool 41 generated by these flows is expressed as $$Ff1 = -Q\rho(U1 \cos \theta 1 - U2 \cos \theta 2)$$

where, Q is flow rate, U1 is flow velocity of the flow 45, U2 is flow velocity of the flow 46, and ρ is density of hydraulic fluid. In the above-described construction, the relationship of θ1>θ2 is adjusted by the angle of the inclined surface 42a so that Ff1 is in the positive direction, that is, in the spool moving direction. Thereby, Ff1 and the fluid force FB counteract each other. Further, by generating a swirl flow 47 in the return port, a force Ff2 in the spool moving direction is provided to reduce the fluid force.

Such a construction is found, for example, in "Hydraulic Pressure Control", Toshio Takenaka and Eizo Urata, 2nd edition, 4th issue, Maruzen Co., Ltd., Feb. 20, 1986, pp. 88–89.

In this construction, when there is no flow returning to the return port 17, 18, the effect of reducing fluid force is not achieved. Also, the angles θ1 and θ2 are often determined so that an ideal fluid force reducing effect can be achieved when the rate of flow going from the supply port 14 to the load port 16 and that going from the load port 15 to the return port 17 are equal to each other. Therefore, when the return flow rate is lower than the flow rate on the supply side, for example, in the case where an actuator to be connected to a spool valve is a cylinder, etc. having a difference in pressure receiving area, this effect is little. Contrarily, when the return flow rate is higher than the flow rate on the supply side, this effect is too great, which presents a problem in that, for example, a force in the opposite direction is created.

Figure 14:
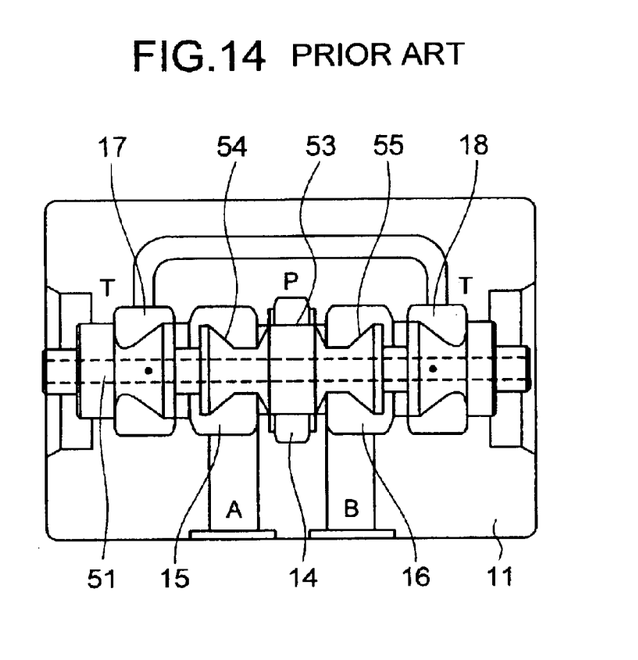
FIG. 14 is a sectional view of a conventional spool valve in which fluid compensation is made at return ports and a supply port.

Thereupon, a construction for solving this problem has been proposed, for example, in JP-A-9-269084. In this construction, as shown in FIG. 14, a wide central land 53 is formed in the center of a spool 51, and concave portions communicating with the load ports 15, 16 are formed on both sides of the central land 53. In addition, fluid compensating pockets 54, 55, which are similar to the pockets 42, 43 shown in FIG. 13, are provided in these concave portions. By the above-described construction, fluid compensation is made between the supply port 14 and the load port 15 or 16 when fluid is supplied from the supply port 14 to one load port 15 or 16 or to the other load port 16 or 15.

The above-described solution has a problem that since the supply port 14 is closed by the wide central land 53, the construction is complex, and the flow path from the supply port 14 to the load port 15 or 16 is restricted, and the pressure loss is high. Also, in what is called a standard type switching valve having an attachment surface of a hydraulic four-port switching valve specified in ISO4401, because of the dimensional limitation, the length between the ports is restricted, so that it is difficult to provide the pocket 54, 55 having a proper shape at two places.

Figure 15:
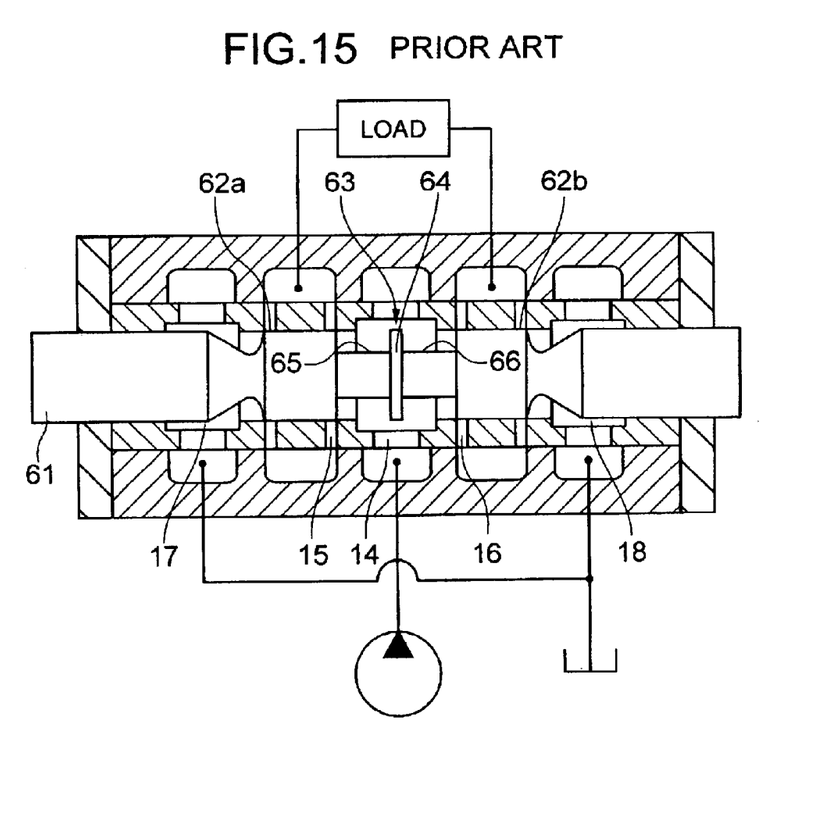
FIG. 15 is a sectional view of another conventional spool valve in which fluid compensation is made at return ports and a supply port.

Thereupon, for example, JP-A-11-82767 has proposed another construction. In this construction, as shown in FIG. 15, like the constructions shown in FIGS. 12 and 13, a spool 61 is provided with a central concave portion 63 and two lands 62a, 62b for opening/closing the load ports, which are formed on both sides of the central concave portion, and furthermore, in the central concave portion 63 of the spool 61, a collar-shaped land 64 narrower than the supply port is provided.

However, in this construction as well, the flow path near the supply port 14 is restricted by the collar-shaped land 64, so that there still arises a problem of high pressure loss. Also, this construction has a problem in that the length in the axial direction of the spool must be ensured to provide the above-described pockets 65, 66 on both sides of the collar-shaped land 64. In addition, the construction is complex.

BRIEF SUMMARY OF THE INVENTION

An object of the invention, in view of the above problems, is to provide a spool valve which is suitable for wide use, has a simple construction and a low pressure loss, and is provided with a spool which can provide fluid force reduction between a supply port and a load port, without increasing the axial length, especially the length between ports.

In order to attain the above object, the present inventors provided a pocket in the central concave portion of a spool, and conducted studies on flow angles θ1 and θ2 and a swirl flow in the pocket in a state of outflow from the supply port to the load port, which is an opposite flow to the before-mentioned inflow on the return side. As a result, a knowledge was obtained that in the case of outflow from the supply port to the load port, even when θ1=θ2, a fluid force decreasing effect enough for practical use is achieved.

Based on this knowledge, the spool valve according to the invention has a fluid force reducer provided in the concave potion of a spool for decreasing a fluid force which acts against the operating force of the spool when the spool valve is actuated. This reducer comprises a spool portion formed so as to let hydraulic fluid smoothly flow along its surface, which is flowing from a supply port to a lord port that is to be supplied with the hydraulic fluid.

This spool valve, since the fluid force reducer is provided only in the concave portion of the spool, can effectively decrease the fluid force acting on the spool during the operation of the valve by a simple construction in which the length in the axial direction is restrained.

The spool valve according to another aspect of the invention comprises a valve body defining an elongate slide hole and a spool slidably received in the slide hole of the valve body. The slide hole has an annular supply port, two annular load ports, and two annular return ports, which are respectively formed in the inner surface of the slide hole. The load ports are disposed symmetrically with the supply port interposed therebetween, and the return ports are respectively disposed on both outer sides of the load ports. The spool has a central concave portion communicating with the supply port of the slide hole and two land portions provided symmetrically with the central concave portion interposed therebetween. The land portions are disposed so as to block off the load ports from the supply port when the spool is at a neutral position. The spool is movable at least between the neutral position and a first position where with the displacement of the land portions, the supply port is allowed to communicate with one of the load ports via the central concave portion and the other load port is allowed to communicate with the adjacent return port. The central concave portion of the spool is formed so that the outside diameter thereof gradually increases from the center in the axial direction of the concave portion toward at least the land portion on the other load port side.

In the above spool valve, at least a half of the central concave portion, which approached the supply port when the valve is actuated, has a shape such that the outside diameter gradually increases from the supply port toward the load port to which hydraulic pressure is to be supplied, that is, an inclined shape. The hydraulic fluid passing through the supply port flows in the central concave portion along this inclined portion, and reaches the load port. Therefore, the hydraulic fluid scarcely stagnates in the central concave portion, and also such a flow exerts an influence on the outflow angle to a restriction or throttling portion between the load port and the corresponding land portion, thereby bringing about a fluid force decreasing effect.

The outside diameter gradually increasing portion in the central concave portion of the spool preferably has a conical shape in which the outside diameter increases lineally. This shape provides simple machining and high accuracy. Alternatively, the outside diameter gradually increasing portion may be in a shape of Japanese hand drum in which the outside diameter increases arcuately. Further, the outside diameter gradually increasing portion need not necessarily have a continuous surface, and may have a stepped columnar shape in which the outside diameter increases discontinuously.

The gradually increasing rate of the outside diameter is preferably set, in terms of one-side angle with respect to the spool center axis, at an angle which is not less than 15 degrees and not exceeding 35 degrees, and the maximum outside diameter is preferably not less than 0.6 and not exceeding 0.8 of the outside diameter of the adjacent land portion. 24 degrees is optimum for the gradually increasing rate of the outside diameter. If the rate is less than 15 degrees or exceeds 35 degrees, the fluid force decreasing effect deteriorates. Optimally, the maximum diameter of the outside diameter gradually increasing portion in the central concave portion is not less than 0.7 of the outside diameter of the adjacent land portion. If it is smaller than 0.6, the flow velocity decreases, and the fluid force decreasing effect is little. If it exceeds 0.8, the flow path is restricted at the inlet of the load port, and the pressure loss increases.

As for the spool valve of two-position type in which a pressure fluid is supplied from the supply port to only one load port, it is sufficient to provide the outside diameter gradually increasing portion only on one side of the central concave portion of spool. On the other hand, in the spool valve of three-position type in which the supply of hydraulic pressure is switched over from the supply port to either of the two load ports, the central concave portion of the spool is preferably formed in a shape symmetrical with respect to the center in the axial direction.

By forming the central concave portion of the spool in the symmetrical shape, the whole length in the axial direction of the supply port can be made one pocket, and thus a dimensional margin can be provided as compared with the above-described conventional spool valve, so that fluid force reduction can be made effectively. Further, since the supply from the supply port to the load ports is accomplished through the same fluid paths at right and left, an equal fluid force decreasing effect can be achieved for both load ports.

In this case, the outside diameter of the central concave portion gradually decreases from both land portions to the center. Therefore, if the length between the land portions is large as compared with the diameter of the land portions so that the diameter at the center is too small, the velocity of fluid flowing along the surface of the central concave portion becomes small, which decreases the fluid force decreasing effect. Further, it is preferable that the spool have a higher strength and the machining amount be smaller. Therefore, it is preferable that a parallel portion, that is, a portion in which the outside diameter is constant, be provided in the vicinity of the center of the central concave portion to prevent the minimum diameter from becoming too small.

The invention can be applied to not only the valve in which hydraulic pressure is supplied to only one load port as described above and the valve of three-position type including the center position but also a two-position directional control valve in which the spool is switched over only between the first position and the second position.

Although the spool valve of the invention has the fluid force reducer provided in the central concave portion of the spool, a fluid force compensating pocket may further be added on the return side of the spool as in the conventional spool valve. The use of the additional fluid force compensating pocket on the return side of the spool can compensate a higher fluid force. On the other hand, in the case where the fluid force compensating pocket is not provided on the return side of the spool, the axial length in the vicinity of the return ports becomes short. Also, in the present invention, even when return fluid is not generated, the fluid force can be decreased.

These and other features and advantages of the invention will be more apparent from the description of embodiments which will be made below with reference to the accompanying drawings.

DETAILED DESCRIPTION OF THE INVENTION

Figure 1:
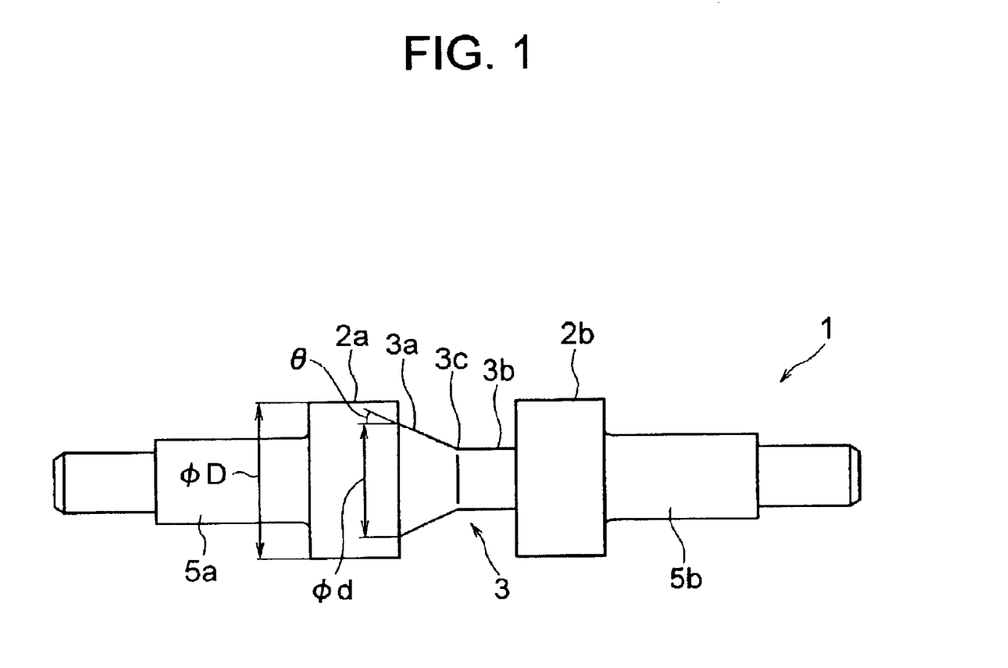
FIG. 1 is a side view of a spool for the spool valve (spool type directional control valve) according to the first embodiment of the invention.
Figure 2:
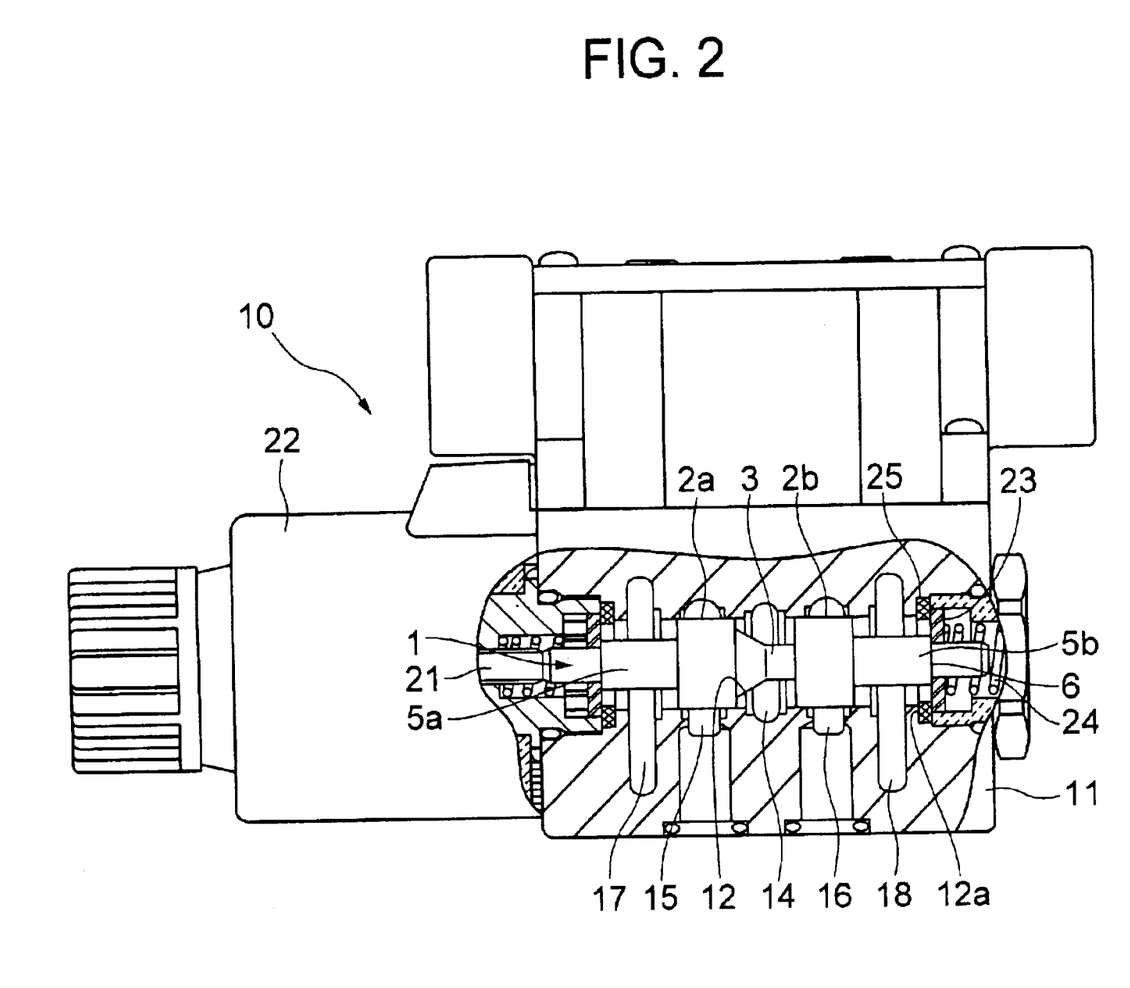
FIG. 2 is a sectional view of an electromagnetic spool valve incorporating the spool shown in FIG. 1.

The embodiments of the invention will be described with reference to the accompanying drawings. FIG. 2 shows the electromagnetic spool valve according to the first embodiment of the invention. Also, FIG. 1 shows a spool for this valve in an enlarged scale.

In FIG. 2, the spool valve 10 has a body 11 formed with a slide hole 12, and a spool 1 is slidably disposed in the slide hole. The slide hole 12 is provided with an annular supply port 14, two annular load ports 15, 16, and two annular return ports 17, 18. The load ports 15, 16 are arranged symmetrically with respect to the supply port 14. The return ports 17, 18 are arranged on the outside of the load ports 15, 16, respectively.

On the other hand, the spool 1 is formed with an annular central concave portion 3 and two land portions 2a, 2b. The central concave portion 3 is disposed so as to be open to the supply port 14 when the spool 1 is at a neutral position. The land portions 2a, 2b are disposed symmetrically on both sides of the central concave portion and are adapted to block off the load ports 15, 16 from the supply port 14 at the neutral position. The spool 1 further has stepped stems 5a, 5b of a smaller diameter on the outside of the land portions 2a, 2b.

On one side of the spool 1, a solenoid 22 is provided. The solenoid 22 pushes the spool 1 in the axial direction via a rod 21 that is in contact with the stepped stem 5a of the spool 1. Reference numeral 23 on the other side of the spool 1 denotes a washer. This washer 23 is urged by a spring 24 to be brought into contact with a step portion 6 of the spool 1. The washer 23 further abuts against an end portion 12a of the slide hole 12 in the body 11 via a ring 25, so that the spool 1 is held at the neutral position by the urging force of the spring 24. In the state in which the spool 1 is at the neutral position as shown, the load ports 15, 16 are blocked off from the supply port 14 by the land portions 2a, 2b, respectively.

Figure 3:
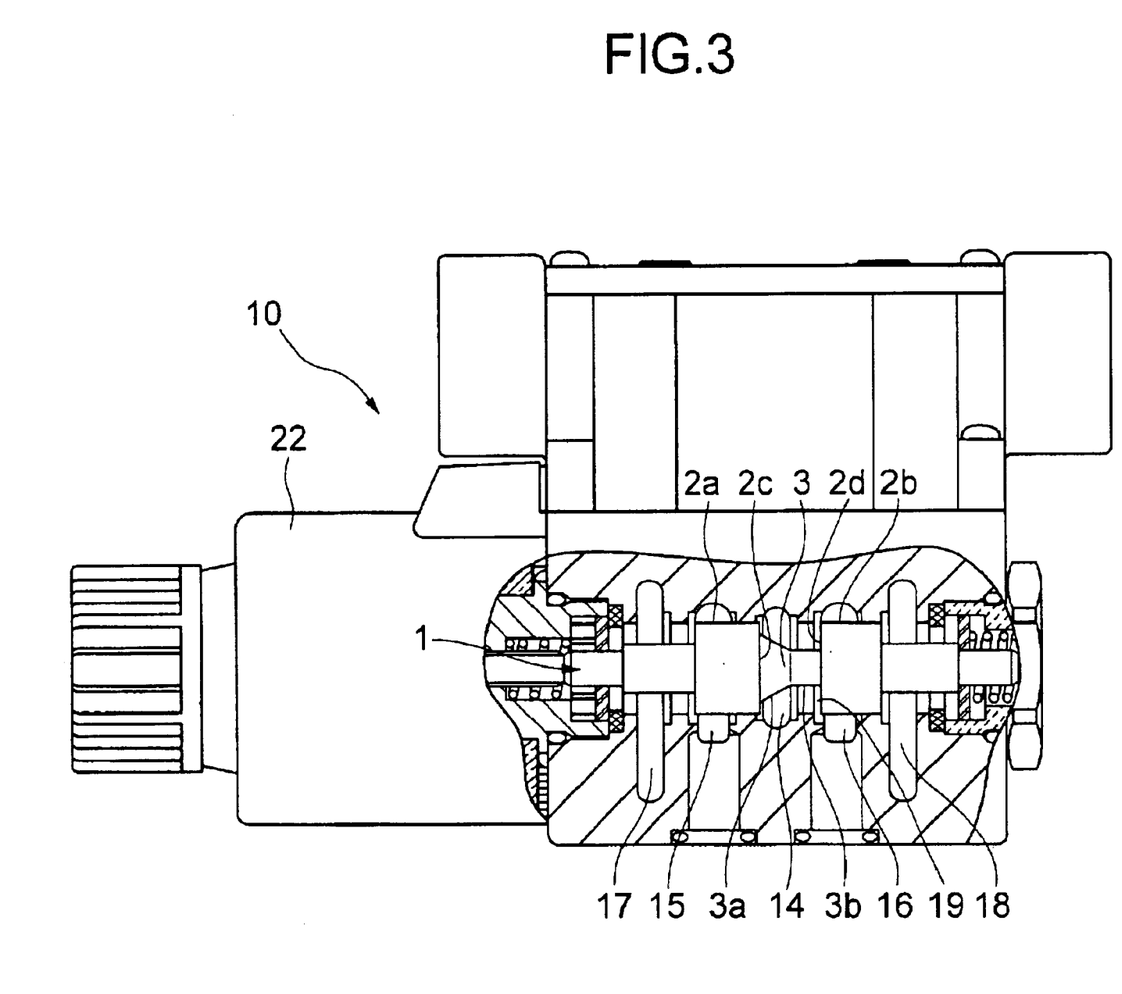
FIG. 3 is a sectional view showing a state in which a solenoid shown in FIG. 2 is energized and the spool is actuated to the right-hand side as viewed in the figure.

The solenoid 22, when energized, moves the spool 1 via the rod 21. Upon the energizing of the solenoid 22, as shown in FIG. 3, the spool 1 moves to the right-hand side in the figure, so that the load port 15 communicates with the return port 17 on the left-hand side of the land portion 2a. At the same time, the supply port 14 communicates with the load port 16 on the left-hand side of the land portion 2b. Thus, by the displacement of the spool 1 caused by the solenoid 22, the supply port 14 is allowed to communicate with the load port 16, and the other load port 15 is allowed to communicate with the return port 17 on the adjacent side. When the solenoid 22 is de-energized, the spool 1 is returned to the neutral position by the urging force of the spring 24.

In the spool 1 for the valve of this embodiment, as shown in FIG. 1, the central concave portion 3 has a shape unsymmetrical in the axial direction. More specifically, a part on the load port 16 side of the center 3c in the axial direction of the central concave portion 3 is formed into a parallel portion 3b of a fixed outside diameter. Also, another part on the load port 15 side is formed into an inclined portion 3a in which the outside diameter gradually increases from the center of the central concave portion 3 to the end of the land portion 2a. The inclined portion 3a has a conical shape in which the outside diameter increases linearly.

Now, the operation of the spool valve 10 having the above construction will be described. As described above, FIG. 3 shows a state in which the spool 1 is moved to the right by the energizing of the solenoid 22. The spool valve 10 is connected at the supply port 14 to a hydraulic fluid source and at the load ports 15, 16 to a hydraulic cylinder, not shown. When the solenoid 22 is energized to move the spool 1, hydraulic fluid flows from the supply port 14 to the load port 16 and is supplied to the cylinder. The fluid pushed out from the return side of cylinder returns to the load port 15 and flows into the return port 17.

During the moving of the spool, when a gap 19 between the load part 16 and an inside end 2d of the land portion 2b is small, a high fluid force is created as mentioned before. In the spool valve 10 of this embodiment, the fluid from the supply port 14 flows along the inclined portion 3a of the spool 1, and flows out of the gap 19. With the flowing along the spool surface, the number of places where fluid flow scarcely exists on the spool surface is decreased, and also a swirl flow is generated. Thereby a force acting in the direction opposite to the spool moving direction is reduced, and pressure imbalance between both wall surfaces of land ends 2c, 2d of the central concave portion 3 is reduced so that a force for closing the spool 1, which is generated by the pressure imbalance, decreases.

For the electromagnetic spool valve constructed as above, the spool switching limit with respect to the passage flow rate was measured by setting an angle θ (FIG. 1) on one side with respect to the spool center axis, which represents the gradually increasing rate of the outside diameter of the inclined portion 3a, at 15 degrees, 25 degrees, and 35 degrees, and by setting an outside diameter φd of the inclined portion 3a of the central concave portion 3 at the land end 2c at 0.6, 0.7 and 0.8 of an outside diameter φD of the land portion 2a, 2b. In this case, the valve size was ⅛ size of a rated flow rate of 40 lit/min, and a spool with an outside diameter φD of 13 mm, a distance between lands of 9.2 mm, and a land width of 9.3 mm was used. As a result, in this range, the switching limit was 12 to 20% improved as compared with the conventional spool valve. In particular, a combination of θ=25 degrees and the outside diameter ratio=0.7 provided the highest performance. Thus, the fact that according to the invention, a force for decreasing the fluid force acts could be confirmed by the experiment.

Figure 4:
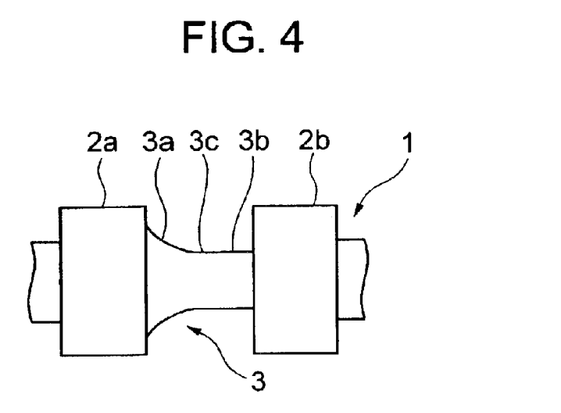
FIG. 4 is a side view showing a modification of the spool shown in FIG. 1.
Figure 5:
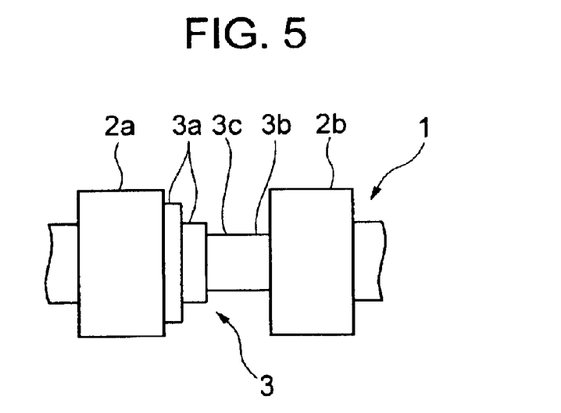
FIG. 5 is a side view showing another modification of the spool shown in FIG. 1.

Next, a modification of the first embodiment will be described. The inclined portion in the central concave portion of the spool shown in FIG. 4 has a shape of Japanese hand drum in which the outside diameter gradually increases in an arcuate form. Also, the central concave portion of the spool shown in FIG. 5 has no continuous surface, but has a stepped columnar shape in which the outside diameter gradually increases in a discontinuous manner. Even such a shape of central concave portion can make similar fluid force reduction. In the modifications shown in FIGS. 4 and 5, the same reference numerals are applied to elements similar to those shown in FIG. 1, and the explanation is omitted.

Figure 6:
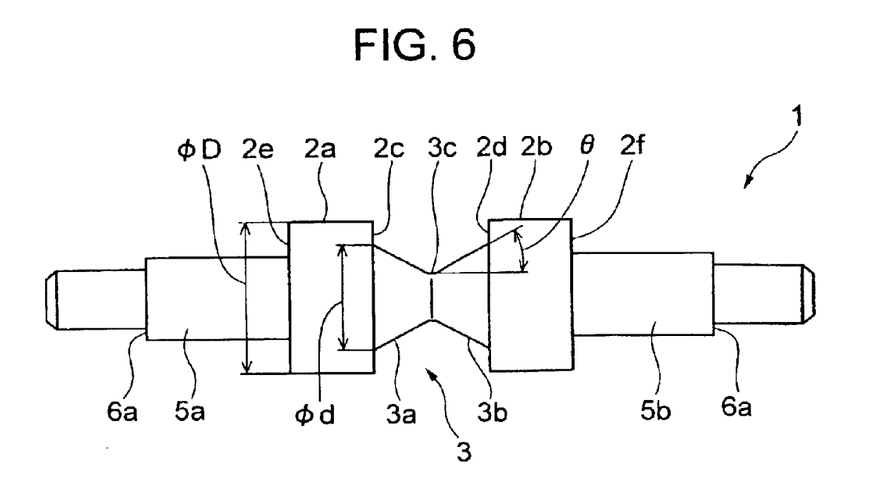
FIG. 6 is a side view of a spool for the spool valve according to the second embodiment of the invention.
Figure 7:
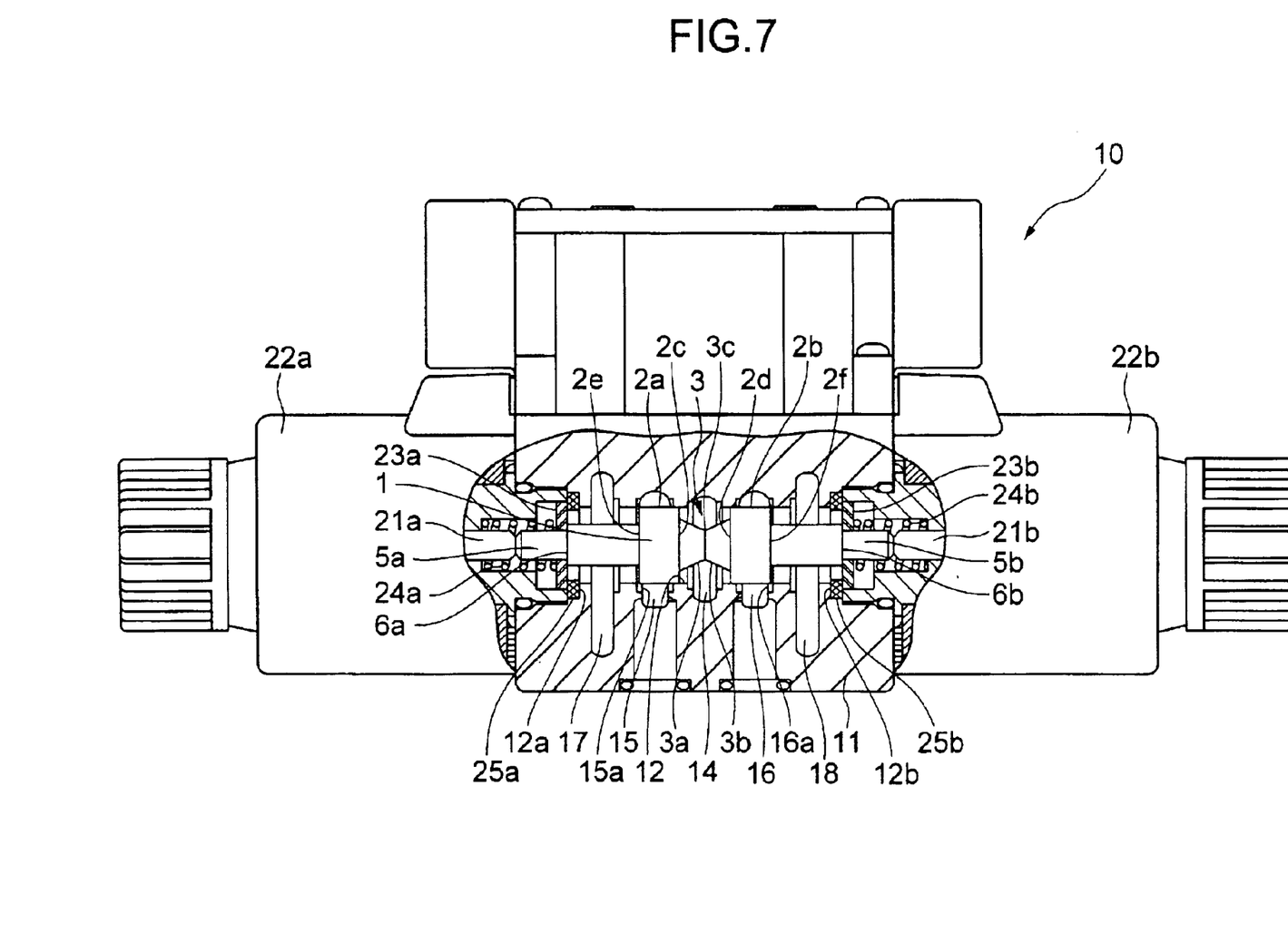
FIG. 7 is a sectional view of an electromagnetic spool valve incorporating the spool shown in FIG. 6.

FIG. 7 shows the electromagnetic spool valve according to the second embodiment of the invention, and FIG. 6 shows a spool used for this valve. In this embodiment, the same reference numerals are applied to elements similar to those shown of the first embodiment.

Referring to FIG. 7, the spool valve 10 has a slide hole 12 formed in a body 11 and a spool 1 slidably disposed in the slide hole. The slide hole 12 is formed with an annular supply port 14, two annular load ports 15, 16, and two annular return ports 17, 18. The load ports 15, 16 are arranged symmetrically with respect to the supply port 14, and are provided with minute gaps 15a, 16a. The return ports 17, 18 are disposed on the outside of the load ports 15, 16, respectively. The spool 1 is formed with an annular central concave portion 3 and two land portions 2a, 2b. The central concave portion 3 is arranged so as to be open to the supply port 14 when the spool 1 is at a neutral position. The land portions 2a, 2b are disposed symmetrically on both sides of the central concave portion 3 and, at the neutral position, block off the load ports 15, 16 from the supply port 14. At this time, the load ports communicate with the return ports 17, 18, respectively, through the minute gaps 15a, 16a. The spool further has stepped stems 5a, 5b of a smaller diameter on the outside of the land portions 2a, 2b.

On both sides of the spool, solenoids 22a, 22b are provided. Each of the solenoids pushes the spool in the axial direction via a rod 21a or 21b that is in contact with the stepped stem of the spool 1. Reference numerals 23a, 23b at both ends of the spool denote washers. These washers 23a, 23b are urged by springs 24a, 24b to be brought into contact with step portions 6a, 6b at both ends of the spool 1, respectively. The washers 23a, 23b are further adapted to abut against end portions 12a, 12b of the slide hole 12 in the body 11 via rings 25a, 25b, respectively, so that the spool 1 is held at the neutral position by the urging forces of the springs 24a, 24b. In the state in which the spool 1 is at the neutral position as shown in FIG. 7, the load ports 15, 16 are blocked off from the supply port 14 by the land portions 2a, 2b, respectively, and on the other hand, communicate with the return ports 17, 18 through the minute gaps 15a, 16a, respectively.

Figure 8:
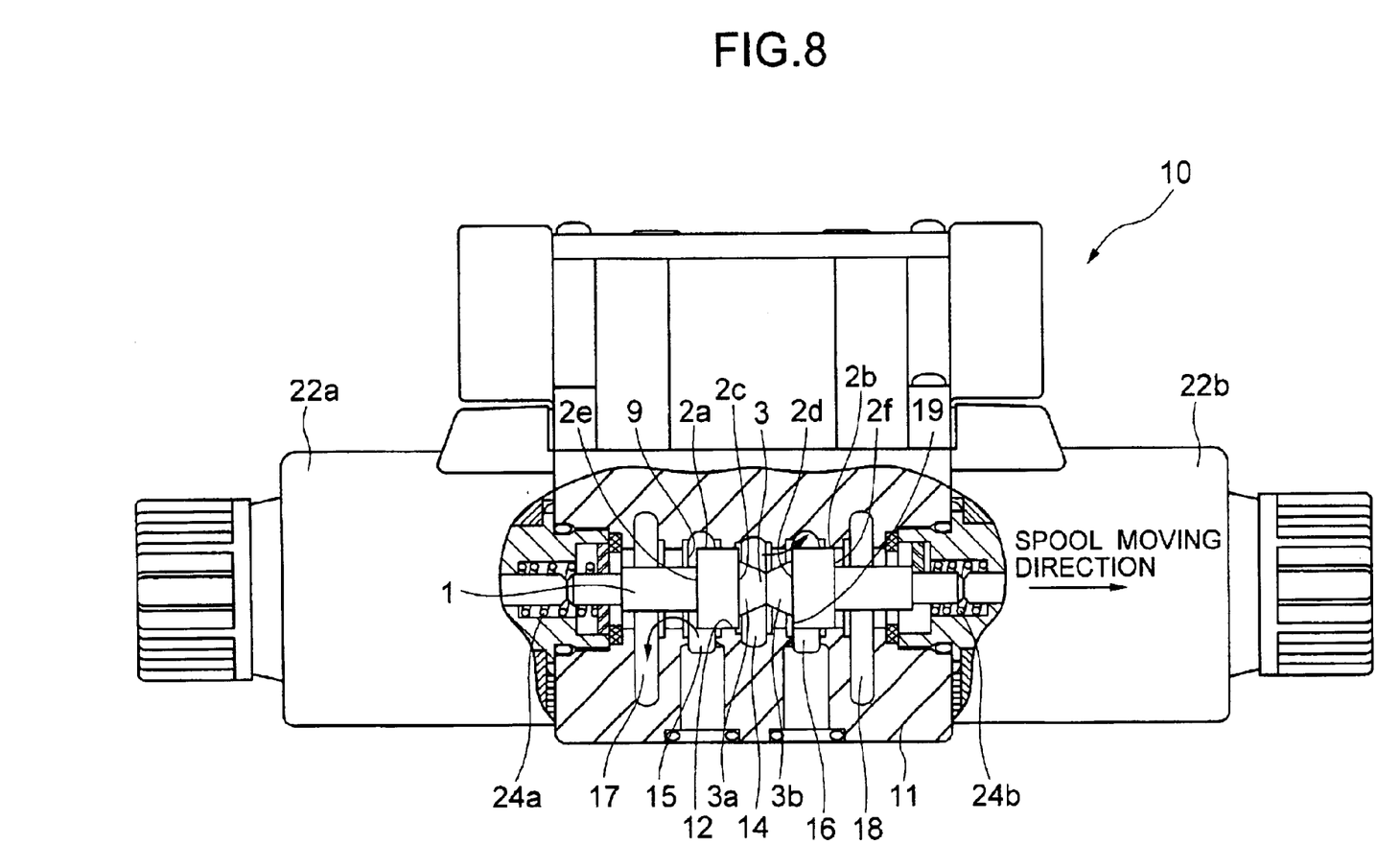
FIG. 8 is a sectional view showing a state in which a solenoid shown in FIG. 7 is energized and the spool is actuated to the right-hand side as viewed in the figure.

When either one of the solenoids 22a, 22b is energized, the spool 1 is moved in the axial direction via the rod 21a or 21b. In the case where the left-hand solenoid 22a in FIG. 7 is energized, as shown in FIG. 8, the spool 1 is moved to the right-hand side. As a result, the load port 15, the left-hand side of the land portion 2a and the return port 17 communicate with each other. At the same time, the supply port 14, the left-hand side of the land portion 2b and the load port 16 communicate with each other, and the load port 16 is blocked off from the return port 18. Thus, the spool 1 is displaced to the right or left by the solenoid 22a or 22b, the supply port 14 is caused to communicate with either one of the load ports 15, 16, and the other load port is caused to communicate with the return port 17 or 18 on the adjacent side. When the solenoid 22a or 22b is de-energized, the spool 1 is returned to the neutral position by the urging force of the spring 24a or 24b.

In this embodiment, as shown in FIG. 6, the central concave portion 3 of the spool 1 has a shape symmetrical in the axial direction. More specifically, the central concave portion 3 is provided with a pair of inclined portions 3a and 3b on both sides of the center 3c in the axial direction. Each of the inclined portions 3a and 3b has a conical shape in which the outside diameter increases gradually from the center 3c toward an inside land end 2c or 2d.

Description will be made on the operation of the electromagnetic spool valve 10 having the above-described construction. As described above, FIG. 8 shows a state in which the spool 1 is moved to the right by the energizing of the solenoid 22a. The spool valve 10 is connected at the supply port 14 to a hydraulic fluid source and at the load ports 15, 16 to a hydraulic cylinder, not shown. When the solenoid 22a is energized to move the spool 1, hydraulic fluid flows from the supply port 14 to the load port 16 and is supplied to the cylinder. The fluid pushed out from the return side of cylinder returns to the load port 15 and flows into the return port 17.

At this time, a gap 9 between the load port 15 and an outside end 2e of the land portion 2a is relatively large, so that a fluid force caused by the fluid passing through this gap is small. On the other hand, a gap 19 between the load port 16 and the inside end 2d of the land portion 2b is narrow, so that the above-described fluid force is created. In this embodiment, the fluid from the supply port 14 flows along the inclined portions 3a, 3b of the spool 1, and flows out of the gap 19. With the flowing along the spool surface, the number of places where fluid flow scarcely exists on the spool surface is decreased, and also a swirl flow is generated. Thereby, as in the case of the first embodiment, a force acting in the direction opposite to the spool moving direction is reduced, and pressure imbalance between both wall surfaces of land ends 2c, 2d of the central concave portion 3 is reduced so that a force for closing the spool 1, which is generated by the pressure imbalance, is decreased.

For the electromagnetic spool valve constructed as above, the spool switching limit with respect to the passage flow rate was measured by setting an angle θ (FIG. 6) on one side with respect to the spool center axis, which represents the gradually increasing rate of the outside diameter of the inclined portions 3a, 3b, at 15 degrees, 25 degrees, and 35 degrees, and by setting an outside diameter ϕd of the inclined portions 3a, 3b of the central concave portion 3 at the land ends 2c, 2d at 0.6, 0.7 and 0.8 of an outside diameter ϕD of the land portion 2a, 2b. In this case, the valve size was ⅛ size of a rated flow rate of 40 lit/min, and a spool with an outside diameter ϕD of 13 mm, a distance between lands of 9.4 mm, and a land width of 7.3 mm was used. As a result, in this range, the switching limit was 10 to 20% improved as compared with the conventional spool valve. In particular, a combination of θ=25 degrees and the outside diameter ratio=0.7 provided the highest performance. Thus, it could be confirmed that according to the invention, a force for decreasing the fluid force acted.

Furthermore, the same experiment as described above was conducted by using a one-side inclined spool in which the right-hand inclined portion 3b in the central concave portion 3 of the spool 1 shown in FIG. 6 is modified to have a fixed diameter (center diameter) as in the case of the first embodiment. As a result, it was found that when the hydraulic fluid flowed in from the inclined surface side and flowed out from the fixed diameter side, this configuration achieved a slightly higher effect of decreasing the fluid force than the spool valve in which the central concave portion had a symmetrical shape. On the other hand, when the flow of the hydraulic fluid is in the opposite direction, this configuration has a less fluid force decreasing effect than the spool valve in which the central concave portion has a symmetrical shape.

Figure 9:
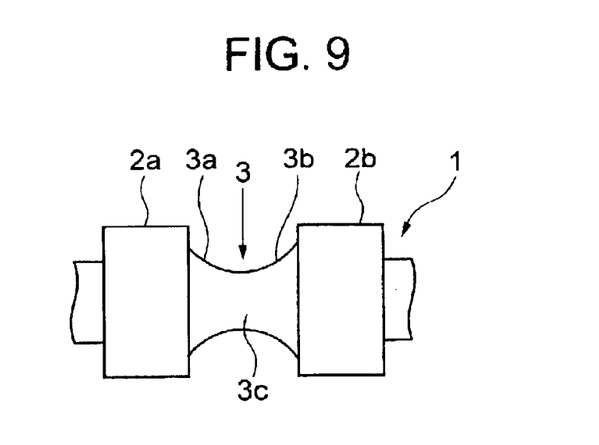
FIG. 9 is a side view showing a modification of the spool shown in FIG. 6.
Figure 10:
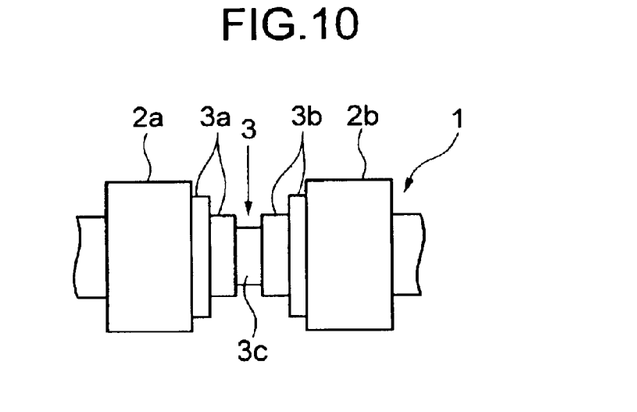
FIG. 10 is a side view showing another modification of the spool shown in FIG. 6.
Figure 11:
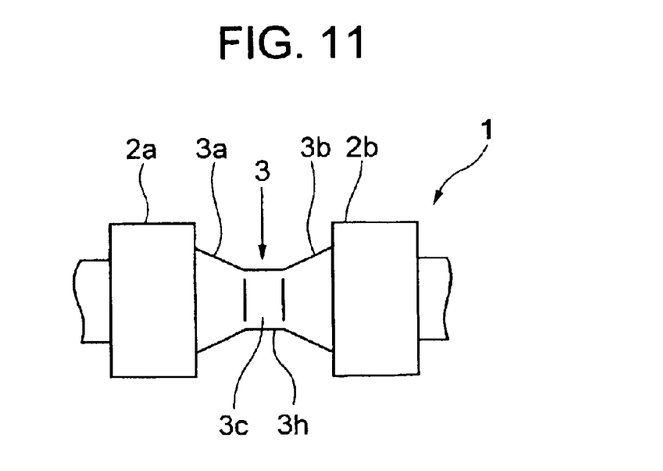
FIG. 11 is a side view showing still another modification of the spool shown in FIG. 6.

Next, a modification of the second embodiment will be described. Each of the inclined portions in the central concave portion of the spool shown in FIG. 9 has a shape of Japanese hand drum in which the outside diameter gradually increases in an arcuate manner. The central concave portion of the spool shown in FIG. 10 has no continuous surface, but has a stepped columnar shape in which the outside diameter gradually increases in a discontinuous manner from the center 3c. Also, in the spool shown in FIG. 11, a parallel portion 3h with a fixed outside diameter is provided between the two inclined portions 3a, 3b in the central concave portion 3 to prevent the outside diameter of the central concave portion from becoming too small. Even such a shape of central concave portion can make similar fluid force reduction. In FIGS. 9 to 11, the same reference numerals are applied to elements similar to those of the first and second embodiments, and the explanation is omitted.

As having described above, according to the invention, the spool is formed in a shape in which the outside diameter of the central concave portion gradually increases from the center toward at least one outside so that a fluid force generated when hydraulic fluid flows out from the supply port to the load port can be decreased in the central concave portion. As a result, a spool that has a margin for dimension, a fluid force decreasing effect, a low pressure loss, and a simple construction is obtained. The spool valve using this spool has no increase in axial length, especially length between ports, and it is suitable for wide use.

The spool valve according to the invention requires no compensation on the return side, is low in cost and small in size, and is suitable for wide use. Also, in this spool valve, since the fluid force can be decreased, the solenoid can be made smaller in size as compared with the conventional general-purpose spool valve, while the rated flow rate being unchanged. On the other hand, inversely, the rated flow rate can be increased with the size of solenoid being unchanged. In this case, the user can select a smaller valve than before, which contributes to reducing the total cost and downsizing equipment in which the valve is incorporated. Further, the spool valve according to the invention achieves the fluid force decreasing effect even if there is no return flow to the return port and fluid flows in one direction from the supply port to the load port, and thus the spool valve can also be used in a usage in which no fluid flows to the return port. Further, in the spool valve according to the invention, the spool can be switched over more easily than in the conventional spool valve due to the decrease in fluid force, so that the spool valve is invulnerable to dirt and dust contained in the fluid, and also achieves improved reliability.

Also, as the inclined portion in the central concave portion has a simple shape such as a conical shape, a shape of Japanese hand drum, a stepped columnar shape, or the like, the machining is easy, the accuracy can be secured easily, and a low cost can be attained.

The gradually increasing rate of the outside diameter of the central concave portion of the spool is set, in terms of one-side angle with respect to the spool center axis, in the range of 15 degrees to 35 degrees, and fluid force reduction can be assured. Further, the maximum outside diameter of the central concave portion is made in the range of 0.6 to 0.8 of the outside diameter of land portion to decrease the throttling at the load port, so that the spool valve according to the invention has a low pressure loss that is equivalent to that of the general-purpose spool valve. Also, since the outside diameter of the central concave portion of the spool is made smaller than that of the land portion, the land width can be machined exactly, and the accuracy of switching position etc. is high.

Although the invention has been described with reference to the embodiments, it will be apparent to those skilled in the art that the invention is not limited to the specific forms, and various changes and modifications may be made without departing from the spirit and scope of the invention as defined by appended claims. For example, although both of the above-described first and second embodiments relate to a solenoid-actuated electromagnetic spool valve, the invention can also be applied to a hydraulic pilot directional control valve actuated by hydraulic force and a manual directional control valve actuated manually.

What is claimed is:

1. A spool valve for switching hydraulic pressure supply to a hydraulic circuit, comprising:
    a valve body defining a slide hole therein and having a pair of load ports for connection to the hydraulic circuit, a supply port for supplying hydraulic fluid and at least one return port for discharging the hydraulic pressure fluid, said four ports being formed in said slide hole respectively;
    a spool received in said slide hole and having a pair of land portions and a concave portion between said land portions, said spool being movable in said slide hole to at least a first position where said land portions and concave portion cause said supply port to communicate with one of said load ports and cause the other load port to communicate with said return port; and
    a fluid force reducer provided in said concave portion, said reducer comprising a spool portion so formed as to, when the spool valve is actuated, let the hydraulic fluid along a surface of said concave portion flow smoothly from said supply port to one of the load ports to which the hydraulic pressure is to be supplied, thereby decreasing a fluid force acting against an operating force of the spool.

2. The spool valve according to claim 1, wherein said spool portion of the reducer includes a portion formed so that a diameter thereof gradually increases from the load port to which the hydraulic pressure is to be supplied toward the other load port.

3. The spool valve according to claim 1, wherein a pair of return ports are provided, said spool is movable between the first position and a second position where the other load port is connected to said supply port and said one load port is connected to a corresponding return port, and said spool portion of the reducer is formed into a shape symmetrical in an axial direction such that a diameter of said concave portion gradually increases from a center in an axial direction of the spool toward the land portions on both sides.

4. A spool valve comprising:

a valve body defining an elongate slide hole therein, said slide hole having an annular supply port, two annular load ports and two annular return ports, which are formed in said slide hole respectively, said load ports being disposed symmetrically with said supply port interposed therebetween, said return ports being disposed respectively on both outsides of said load ports; and a spool slidably received in said slide hole of the valve body and having a central concave portion communicating with said supply port of the slide hole and two land portions provided symmetrically with said central concave portion interposed therebetween, said land portions being disposed so as to block off said load ports from said supply port when said spool is at a neutral position, said spool being movable at least between said neutral position and a first position where with displacement of said land portions, said supply port is allowed to communicate with one of said load ports via said central concave portion and the other load port is allowed to communicate with an adjacent return port, said central concave portion being formed so that an outside diameter thereof gradually increases from a center in an axial direction of said concave portion toward at least the land portion of the other load port.

5. The spool valve according to claim 4, wherein the outside diameter gradually increasing portion of said central concave portion is formed in a conical shape in which the outside diameter increases linearly.

6. The spool valve according to claim 4, wherein the outside diameter gradually increasing portion of said central concave portion is formed in a shape of Japanese hand drum in which the outside diameter increases in an arcuate form.

7. The spool valve according to claim 4, wherein the outside diameter gradually increasing portion of said central concave portion is formed in a stepped columnar shape in which the outside diameter increases discontinuously.

8. The spool valve according to claim 4, wherein a gradually increasing rate of the outside diameter of said central concave portion is, in terms of one-side angle with respect to a spool center axis, in a range of 15 degrees to 35 degrees, and a maximum outside diameter of said central concave portion is in a range of 0.6 to 0.8 of an outside diameter of the adjacent land portion.

9. The spool valve according to claim 4, wherein said spool is movable between said first position and a second position, which is opposite to said first position with said center position interposed therebetween, and where said supply port communicates with the other load port and the one load port communicates with an adjacent return port, and said central concave portion of the spool is formed in a shape symmetrical in the axial direction, in which the outside diameter gradually increases from the center in the axial direction of said concave portion toward the respective land portions.

10. The spool valve according to claim 9, wherein said central concave portion has a portion of a fixed outside diameter provided between the two outside diameter gradually increasing portions.

11. The spool valve according to claim 9, wherein each of said outside diameter gradually increasing portions is formed in a conical shape in which the outside diameter increases linearly.

12. The spool valve according to claim 9, wherein each of said outside diameter gradually increasing portions is formed in a shape of Japanese hand drum in which the outside diameter increases in an arcuate form.

13. The spool valve according to claim 9, wherein each of said outside diameter gradually increasing portions is formed in a stepped columnar shape in which the outside diameter increases discontinuously.

14. The spool valve according to claim 9, wherein a gradually increasing rate of the outside diameter of said central concave portion is, in terms of one-side angle with respect to a spool center axis, in a range of 15 degrees to 35 degrees, and a maximum outside diameter of each portion on both sides of the center of said central concave portion is in a range of 0.6 to 0.8 of an outside diameter of an adjacent land portion.

* * * * *